United States Patent [19]
Wright

[11] 3,720,556
[45] March 13, 1973

[54] METHOD FOR THE PREPARATION OF WALLED STRUCTURES

[75] Inventor: Donald R. Wright, Midland, Mich.

[73] Assignee: The Dow Chemical Company, Midland, Mich.

[22] Filed: July 13, 1970

[21] Appl. No.: 61,030

Related U.S. Application Data

[62] Division of Ser. No. 670,055, Sept. 25, 1967, Pat. No. 3,578,537.

[52] U.S. Cl. ............156/156, 52/2, 52/80, 156/195, 156/198, 156/199, 156/285, 156/292, 156/296, 161/407
[51] Int. Cl. ......B29c 17/00, B32b 31/12, B04c 2/30
[58] Field of Search......156/156, 285, 147, 287, 145, 156/198, 184, 191, 193, 195, 250, 251, 292, 253, 162, 165, 199, 296; 52/2, 80

[56] References Cited

UNITED STATES PATENTS

| | | | |
|---|---|---|---|
| 3,226,285 | 12/1965 | Iovenko | 161/178 X |
| 3,206,899 | 9/1965 | Wright | 52/80 |
| 3,407,007 | 10/1968 | Fassauer | 52/80 X |
| 2,753,596 | 7/1956 | Bailey | 156/156 |
| 3,338,001 | 8/1967 | Frazer | 52/2 |
| 2,812,769 | 11/1957 | Schaefer | 52/80 |
| 3,454,695 | 7/1969 | Holmgren | 264/209 |

Primary Examiner—Robert F. Burnett
Assistant Examiner—Lorraine T. Kendell
Attorney—Griswold & Burdick, Richard G. Waterman and Robert B. Ingraham

[57] ABSTRACT

A structure is prepared by the spiral generation technique employing a flattened plastic tube which is inflated by means of internal fluid pressure and deposited in a generally helical manner. Adjacent turns of the helix are adhered to each other to provide a walled structure.

6 Claims, 4 Drawing Figures

INVENTOR.
Donald R. Wright

INVENTOR.
Donald R Wright
BY
Robert B Ingraham
AGENT

METHOD AND APPARATUS FOR THE PREPARATION OF WALLED STRUCTURES AND WALLED STRUCTURE

This application is a divisional application of our copending application Ser. No. 670,055, filed Sept. 25, 1967 now U.S. Pat. 3,578,537.

This invention relates to a spirally generated structure, method and apparatus for the production thereof, and more particularly relates to a method, apparatus and structure prepared from tubular plastic film or the like.

A need exists for a means of rapidly constructing structure and enclosures with a minimum of material and manpower. One such method of constructing walled structures is disclosed in my U.S. Pat. No. 3,206,899, wherein synthetic resinous foam is spirally or helically disposed to provide a structure which may be employed as is or subsequently overcoated with a hardenable material such as a plastic or mortar-like material. There is a need for temporary enclosures which may be rapidly erected employing a minimum quantity of building material which can be shipped or transported while occupying a minimum of volume. A number of structures exist which consist essentially of a thin flexible shell or bladder which is inflated by means of internal air pressure usually supplied by a blower or compressor capable of providing a relatively large volume of air at a low pressure, such as pressures on the order of a few ounces per square foot. Such structures have the inherent disadvantage of requiring a constant supply of gas or air pressure in order to maintain their form and generally continuously lose air through entryways and the like. A variety of temporary structures are prepared by employing a flexible walled building and incorporating therein a plurality of ribs or elongate passageways which are stiffened by inflation with air. Generally, such structures must be prefabricated to a predetermined size and subsequently transported to the erection site, thus providing little flexibility with regard to dimension.

It would be advantageous if there were available an improved method for the preparation of walled structures from a minimum amount of material.

It would also be advantageous if there were available an improved walled structure which could be field fabricated to a dimension determinable in the field.

It would also be advantageous if there were available an improved lightweight walled structure supported by fluid pressure.

It would be further advantageous if there were available an improved apparatus for the preparation of structures supported by internal fluid pressure.

It would also be beneficial if there were available an improved method, apparatus and structure which did not require a constantly applied source of fluid pressure to maintain the structure in an erected condition.

These benefits and other advantages in accordance with the present invention are obtained in a walled structure which comprises an inflated flexible tube formed into a plurality of turns in a generally helical form wherein adjacent turns are adhered to each other and a fluid under pressure disposed within the inflated tube.

Also contemplated within the scope of the present invention is a method for the preparation of walled structures which comprises securing a portion of a hollow flexible tube to a base, inflating a portion of the tube by means of an internally disposed fluid under pressure, depositing successive turns of the tube while inflating the tube by means of internal fluid pressure as it is deposited and simultaneously adhering adjacent turns to each other.

Also within the scope of the present invention is an apparatus for the preparation structures of inflated flexible tubular material, the apparatus comprising in cooperative combination an elongate member having a first end and a second end, the first end of the elongate member being flexibly restrained, the second end of the elongate member adapted to trace a surface of a solid geometric figure, the second end of the elongate member having affixed thereto means to supply a flattened flexible tube, means to adhere the tube to an adjacent layer of tubing and means to supply a fluid under pressure to a flattened tube dispensed by the film supply means.

Further features and advantages of the present invention will become more apparent from the following specification taken in connection with the drawing wherein:

FIG. 1 schematically depicts a simplified embodiment of the apparatus of the present invention.

Figure 1:
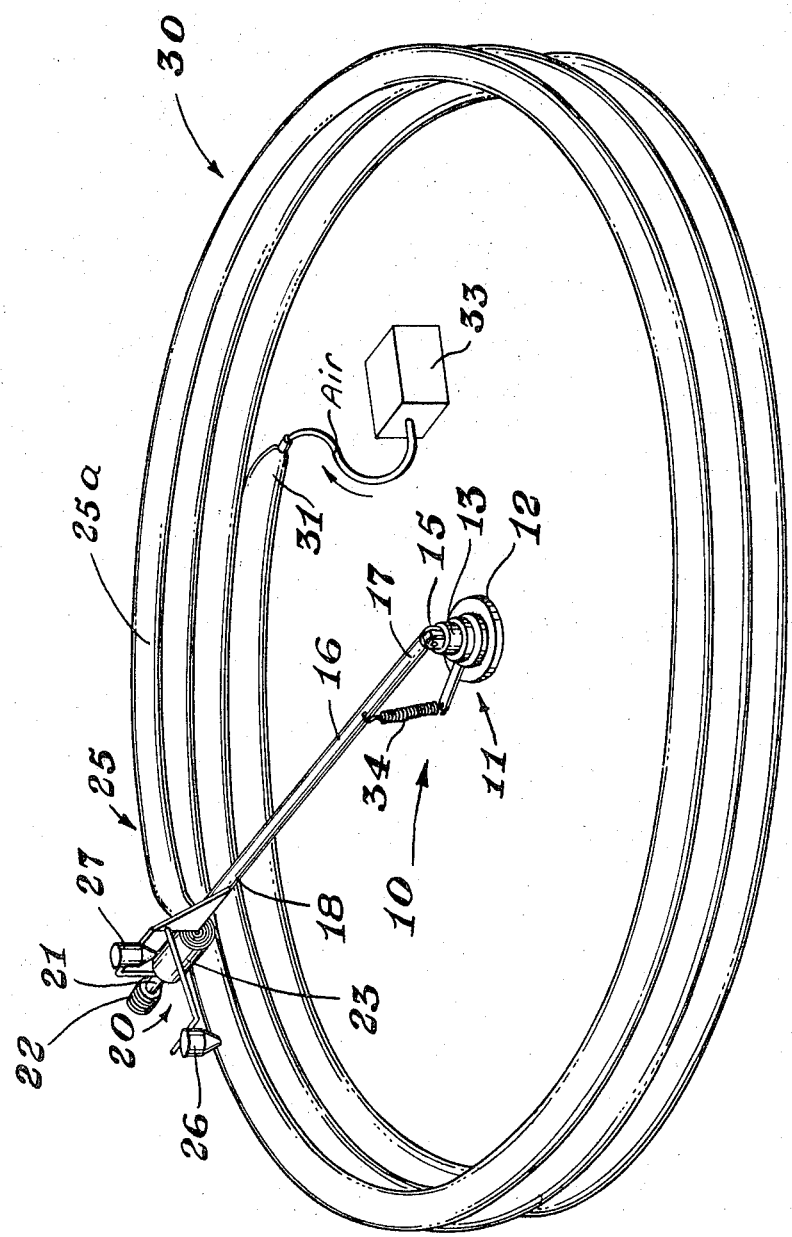

In FIG. 1 there is schematically represented an apparatus in accordance with the present invention generally designated by the reference numeral 10. The apparatus 10 comprises in cooperative combination a base member 11, the base member 11 is affixed to a foundation wall, base or floor 12 such as a concrete slab, earth, bituminous surface or the like. The base member 12 has a first pivot 13 adapted to rotate about an axis normal to the base 12 and a second pivot 15 affixed to the pivot 13 and adapted to pivot about an axis generally parallel to the base 12. An elongate member arm or boom 16 having a first end 17 and a second end 18 is affixed to the pivot 15 at the first end 17 and thus may rotate in a solid angle about the axis of the pivot 13. A film supply means 20 is disposed at the second end 18 of the boom 16. The film supply means 20 comprises a mandrel 21 having a tensioning means 22 in operative engagement with a roll of flattened film 23 whose axis is disposed generally parallel to the axis of the elongate element 16. The roll 23 is adapted to rotate restrained only by frictional forces and the tension adjustment means or spring 22. Thus, a flattened tubular plastic film generally designated by the reference numeral 25 is unrolled from the portion of the roll 23 generally directed toward the support 12. A first adhesive applicator 26 is supported by the second end 18 of the arm 16 and adapted to apply an adhesive at a location remote from the roll 23 at a location lying on a circumferential path traced by the roll as the boom 16 rotates about the pivot 13 in a plane generally parallel to the plane of the support 12. A second adhesive applicator 27 is supported by the second end 18 of the boom 16 and adapted to apply an adhesive to the roll 23. A generally helically spirally disposed inflated tube 25a is shown at a location generally substantially equivalent to the path traced by the roll 23. As the arm 16 is rotated about the pivots 13 and 15, the helically disposed tube 25a forms a walled structure generally designated by the reference numeral 30. Remote from the roll 23, the tube 25a has a remote terminal portion 31 which is in operative communication with a source 33 of a fluid under pressure sufficient to inflate the flattened tube 25 to form the tube 25a. A tensioning means 34 is affixed to the first end 17 of the boom 16 to vary the force exerted by the roll 23 toward the base or support 12.

In operation of the embodiment of the invention as depicted in FIG. 1, a roll of a suitable flattened tubular material is positioned on the second end 18 of the boom 16, the tensioning means adjusted to provide the desired resistance to rotation, the adhesive dispensers or applicators 26 and 27 filled with a desired adhesive suitable to the nature of the particular material employed as the flattened film. The terminal end 31 of the tube 35 is operatively connected to a source of fluid under pressure such as compressed air. As the compressed fluid enters the tube, the tube is inflated to form the inflated tube 25a tending to raise the second end 18 of the boom 16. However, the frictional resistance of the pivots 13 and 15 and the tensioning means 22 are adjusted in such a manner that the circumferential component of force is such that the boom is caused to travel about a circle depositing adhesive coated flattened film which adheres to the base, and after completing a turn, the tube 25 is deposited upon itself and adheres to itself in such a manner that a helical spirally generated structure is produced wherein adjacent turns of the inflated tube are adhered to each other to form a unitary body. The rate of deposition beneficially is controlled by the rate of injection of pressurized fluid into the remote end 31 of the tube, and beneficially such a rate is adjusted to take advantage of the characteristics of the particular adhesive means employed to join the adjacent turns of spirally deposited tubing together. The choice of the particular flattened tubing material employed is predicated entirely upon the end use of the resultant structure and the degree of permanence desired. Similarly, the adhesive or adhesive means is selected to suit the particular material and provide a desired degree of tack or cure, depending upon the desired rate of construction. Beneficially, solvent sealing may also be employed in many cases wherein the plastic forming the tube is readily softened. These techniques are well known in the art.

Beneficially, in the embodiment depicted in FIG. 1, almost any desired flexible thermoplastic tubing may be utilized, including polyolefins such as polyethylene and polypropylene, polyvinylchloride, nylon, as well as fabric reinforced tubing or air impervious treated fabrics. Although the embodiment of FIG. 1 is depicted as having two adhesive dispensers, this embodiment is particularly suited for use with adhesives where it is desirable to deposit the coat of adhesive on each surface and permitting evaporation of at least some of the solvent prior to contacting of some of the surfaces by the selection of suitable adhesives only the first or the second adhesive applicator may be desirable. The tension member 34 is adapted to pivot with the boom and beneficially control the width of the adhesive joint and may serve to either urge the arm 16 away from the base 12 or draw the arm 16 toward the base 12, depending upon the width of adhesive joint, thickness of the tubing, the weight of the boom and accessories and the like. Such variables are well within the skill of those in the plastics fabricating art.

Beneficially, structures prepared in accordance with the present invention from tubes having an internal surface which is heat sealable may readily have windows, doors and other openings formed by means of compressing in a generally radial manner selected portions of the inflated tubing and heat sealing of the inner surfaces together. Beneficially, if a double heat seal is provided, that is, a heat seal wherein two linear seals extend across the tube, a closure with an integral hinge is obtained by severing selected portions of the region lying between the two heat seals. Such heat seals may be formed during the fabrication of such a structure or after completion thereof. If the heat seals are formed before the completion of the structure, it is necessary to alter the location of fluid pressure injection. This is readily accomplished using hardenable check valves of a variety well known in the art and frequently used for automotive tires, footballs, basketballs, beach balls and the like.

Figure 2:
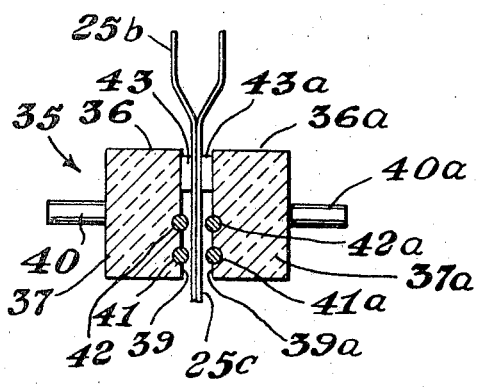
FIG. 2 is a schematic representation of a sealing apparatus particularly suited for the formation of access openings in structure of the present invention.

In FIG. 2 there is depicted a sectional view of a heat sealing device particularly adapted for the formation of seals in inflated tubular structures such as the structure 30 of FIG. 1. The sealing device is generally indicated by the reference numeral 35 and comprises generally mirror image sealing elements 36 and 36a. The corresponding elements of the sealing element 36a are designated in FIG. 2 by corresponding reference numerals having the suffix a. The sealing member 36 comprises a thermally insulating elongate support body 37 having a sealing face 39. A support means or handle 40 is affixed to the body 37 remote from the sealing face 39. First and second sealing elements 41 and 42 are affixed to the face 39. The sealing elements 41 and 42 have a generally elongate configuration and are adapted to engage a flattened portion 25c of an inflated heat sealable tube 25b. On the sealing face 39 is also disposed a resilient clamping element 43 adapted to engage and flatten an inflated tube such as the tube 25b when the sealing members 36 and 36a are forced toward each other. When the sealing elements 36 and 36a have been forced together in opposed clamping relationship over the heat sealable tube portion 25c, the sealing elements 41 and 41a and 42 and 42a are in opposed clamping relationship. The temperature of at least one of the elements 41, 41a, and 42 and 42a is raised to a temperature sufficient to induce heat sealing of the inner surfaces of the flattened tube portion 25c. Beneficially, when forming integral closures, heat is applied to at least two of the elements such as the elements 41 and 42 to provide two heat sealed regions spaced apart in a direction generally transverse to the direction of the tube to form an integral closure when a portion of the region between the heat seals is severed.

Figure 3:
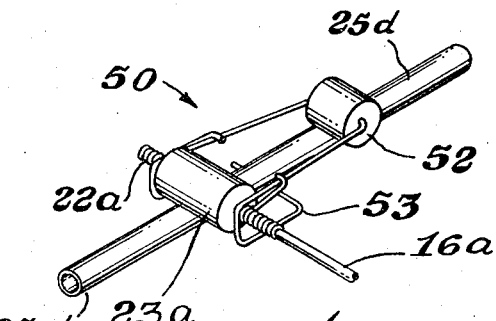
FIG. 3 is a schematic representation of an alternate joining means for the apparatus of the present invention.

An alternate embodiment of the apparatus of the present invention is depicted in FIG. 3 and is generally designated by the reference numeral 50. A boom 16a supports a roll of flattened heat sealable film 23a tensioned by suitable tensioning means 22a. A pivoted pressure means or roller 52 is supported from the boom 16a as is heat sealing element 53. The pressure means 52 and heat sealing element 53 are adapted to lie on opposite sides of an inflated tube 25d which, as the boom 16a progresses in the direction indicated by the arrow, heat seals the tube 25d to an adjacent inflated tubular turn of the inflated tube 25d.

Figure 4:
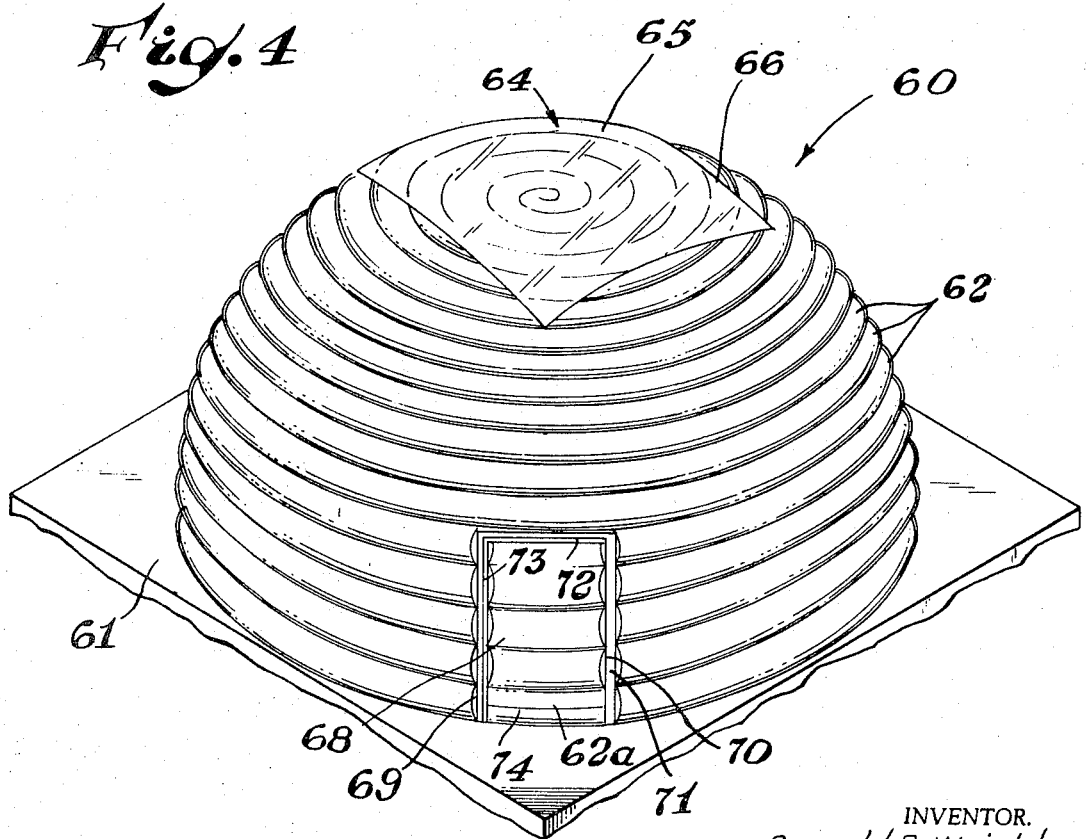
FIG. 4 is a schematic representation of a complete structure in accordance with the invention.

In FIG. 4 there is depicted a completed structure in accordance with the present invention generally designated by the reference numeral 60. The structure 60 is disposed and adhered to a generally homaloidal base 61. The structure 60 comprises a plurality of generally helically spirally disposed turns 62 of an inflated synthetic resinous tubing, the adjacent turns being adhered to each other by a suitable adhesive. The structure 60 has an upper portion or top closure 64 which comprises the inflated tube 65 wound upon itself and forced into an opening resulting from the inherent limitation that the apparatus of the invention cannot generate a complete hemisphere but inherently leaves a small opening at the upper portion thereof. This upper opening is readily closed by removing the apparatus, inflating a length of tubing and manually forming it to close a major portion of the remaining opening. A cap or protective sheet 66 is disposed over the upper portion 64 of the structure 60 and adhered thereto by a suitable adhesive. An entranceway 68 is disposed in the structure 60. The entranceway 68 is formed from the tubular wall of the structure 60 by forming a first generally rectangular heat seal 69 and a second generally rectangular heat seal 70 disposed within and parallel to the heat seal 69. A flattened film portion 71 is disposed between the heat seals 69 and 70. The flattened portion 71 lying between the seals 69 and 70 is severed along the top edge 72 and one side 73 to form an L-shaped cut. The inflated tubular portion 62a disposed adjacent the base 61 and lying between the seals 69 and 70 is stripped from the base and advantageously an abrasion resistant strip 74 adhered to the portion of the tube 62a adjacent the base, thus forming a doorway with a door plug and integral hinge in the form of the flattened portion of the tube 71 opposite the side 73. If desired, the portion 62a may be partially deflated, that is, some of the fluid pressure removed therefrom, to permit easier opening and closing of the door plug. However, where the tubing is spirally-helically disposed, that is, in a generally hemispherical form, the doorway need only be forced for a relatively short distance outwardly until it no longer frictionally engages the base. As the wall approaches a cylindrical form, deflation of the lower tubular portion is usually desirable.

In forming structures in accordance with the present invention, tubing may be employed which has appreciable elongation or tubing which has relatively little or no elongation. For example, a structure prepared from polyethylene tubing which elongates readily under stress forms smooth interior walls with little or no sign of wrinkling. If a fabric reinforced tube is employed wherein a fabric is employed which permits little or no elongation of the tube wall, generally wrinkles appear on the inner walls increasing in size as the dimension decreases. Such wrinkles do not appear to have any significantly deleterious effect on the resultant structure.

By way of further illustration, employing an apparatus generally as illustrated in FIG. 1 and polyethylene tubing which has an inflated diameter of 11.5 inches, a 30 foot diameter dome is constructed in the following manner: a sheet of 8 mil thick polyethylene is disposed on the ground, the sheet being about 40 feet square. About 2 feet of the edge portions of the sheet are disposed in a trench and the trench backfilled. The base corresponding to the base 11 of the apparatus 10 of FIG. 1 is centrally disposed on the sheet. An adhesive solution consisting of 10 weight percent polyisobutylene having a molecular weight of about 125,000 in cyclohexane is spread to form an annular ring about 30 feet in diameter and about 8 inches in width. A small gasoline driven blower is affixed to one end of the polyethylene tubing carried by the apparatus. The arm corresponding to the arm 16 is rotated about the central pivot at a rate sufficient to permit the polyisobutylene adhesive solution to become tacky prior to contact with the freshly inflated film. When the arm has rotated one full turn, the tubing is pressed manually to form good contact with the previously deposited inflated tubing. When the arm has rotated about 380°, the air pressure delivered by the generator is adjusted to control the speed of rotation of the arm to correspond to the drying rate of the adhesive and the tubing is deposited without further attention until a relatively small opening is left at the upper portion of the dome. The air delivered by the blower to the inflated structure is reduced to prevent further motion of the arm. The adhesive applicator, roller and the outermost portion of the arm are removed. A portion of the tubing is manually unwound from the roll, tied off and heat sealed to prevent air leakage and is manually positioned within the opening in substantially the manner illustrated in FIG. 4. A door plug is formed by heat sealing and cutting in the hereinbefore described manner by means of manually held heat sealers simultaneously operated from both the inside and the outside of the door. The resultant structure appears to be quite sturdy and resistant to wind. A 2 inch opening is formed in the tubing by means of a sharp blade and the structure permitted to deflate. The opening is subsequently patched and a 2 inch diameter polyvinyl chloride film tube is adhesively affixed thereto to communicate with the interior of the tube forming the deflated structure. The structure is subsequently reinflated by means of the blower, the polyvinyl chloride tubing disconnected from the blower, knotted and heat sealed.

In a manner similar to the foregoing illustration, other inflatable structures are readily formed utilizing a tubing which has relatively low elongation such as polyvinyl chloride-coated nylon. Rectangular structures are readily prepared by inflation of the tubing, forming 90° bends and forming into a rectangular spiral which is readily accomplished using guide posts in the corner locations. Similarly, polygonal structures are readily fabricated in a like manner employing suitable guides. The adhesive may be manually deposited in cases where dome-like structures are not desired.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of walled structures by a spiral generation procedure wherein a plurality of loops or turns of a material are deposited in a generally helical manner and adjacent turns of the material adhered to each other to form a structure, the improvement which comprises providing a hollow flexible air-impervious tube, positioning and securing a portion of the hollow flexible tube on a base with the portion of the tube operatively connected to a source of fluid under pressure, introducing said fluid under pressure into said tube to inflate the same and controlling the fluid pressure and the tube in such a manner that the force from said fluid pressure causes said tube to travel helically-spirally and be deposited upon itself to form a helical spirally generated structure, and bonding the adjacent turns of said inflated tube to each other as they are deposited to form a unitary body.

2. The method of claim 1 wherein the flexible tube is a synthetic resinous thermoplastic tube.

3. The method of claim 1 including depositing successive turns in a helical spiral manner to provide a dome-like structure.

4. The method of claim 1 including the steps of flattening and sealing adjacent portions of the tube, severing the tube in the sealed region to form an entrance way.

5. The method of claim 4 including the step of partially severing in the region of the flattened sealed tube to provide an integrally hinged door plug.

6. The method of claim 1 wherein the hollow flexible tube is disposed in a generally polygonal manner.

* * * * *